Figure 1:
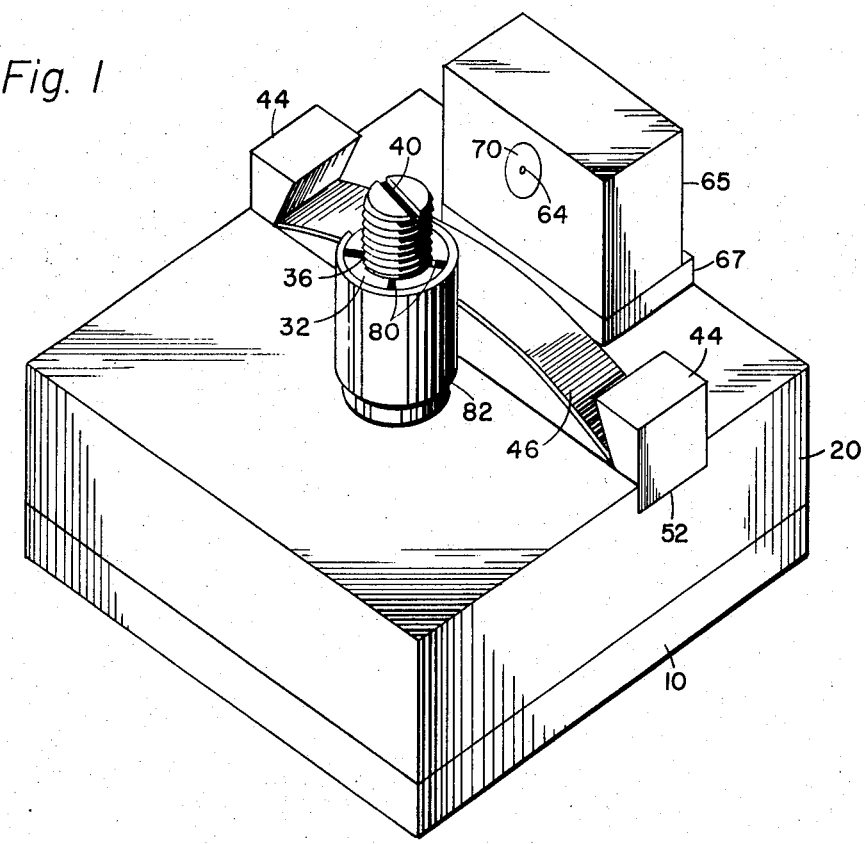

United States Patent [19]
Friend

[11] 3,714,606
[45] Jan. 30, 1973

[54] TEMPERATURE COMPENSATED TUNER AND OSCILLATOR

[75] Inventor: Lawrence O. Friend, Scottsdale, Ariz.

[73] Assignee: Motorola, Inc., Franklin Park, Ill.

[22] Filed: July 12, 1971

[21] Appl. No.: 162,019

Related U.S. Application Data

[63] Continuation of Ser. No. 4,688, Jan. 21, 1970, abandoned.

[52] U.S. Cl. ............... 331/107 R, 331/66, 333/83 T, 334/5, 337/396
[51] Int. Cl. ............................................. H03b 7/14
[58] Field of Search ..... 331/66, 107; 333/83 T, 83 R; 334/5; 337/396; 335/217

[56] References Cited

UNITED STATES PATENTS

| | | | |
|---|---|---|---|
| 2,439,809 | 4/1948 | Hunter | 334/5 |
| 2,679,566 | 5/1954 | Clark | 337/396 |
| 3,047,818 | 7/1962 | Regis | 331/66 |
| 3,108,240 | 10/1963 | Riblet | 333/83 R |
| 3,250,961 | 5/1966 | Parker | 335/217 |
| 3,623,146 | 11/1971 | Kaneko | 333/83 T |

*Primary Examiner*—John Kominski
*Attorney*—Mueller, Aichele & Gillman

[57] ABSTRACT

An oscillator the tuned element of which comprises a resonant cavity, may vary in frequency as the temperature thereof varies. An oscillator of the cavity type is disclosed in which means are provided to reduce the variation of oscillator frequency with temperature change comprising a dielectric rod and means to move the rod more or less into the cavity comprising a pre-stressed metallic element which is held in a bowed shape by another metallic element, the temperature co-efficients of expansion of the two metallic elements being different.

5 Claims, 8 Drawing Figures

Patented Jan. 30, 1973

3,714,606

2 Sheets-Sheet 1

INVENTOR.
Lawrence O. Friend
BY
Mueller, Aichele & Raumer
ATTY'S.

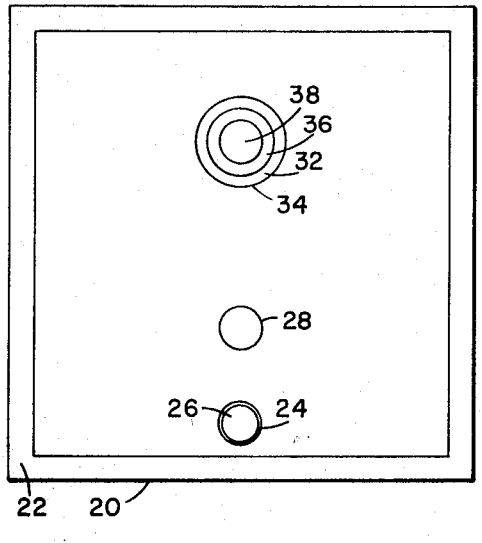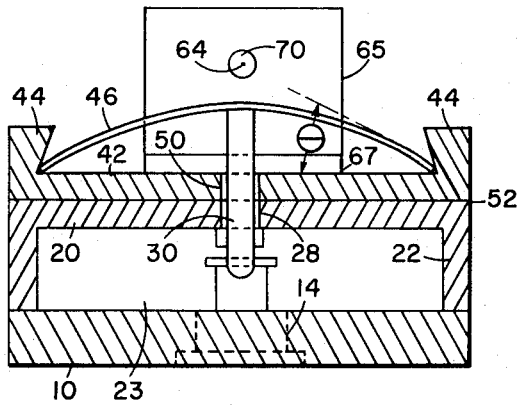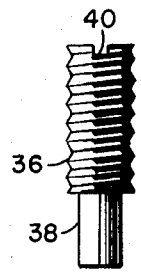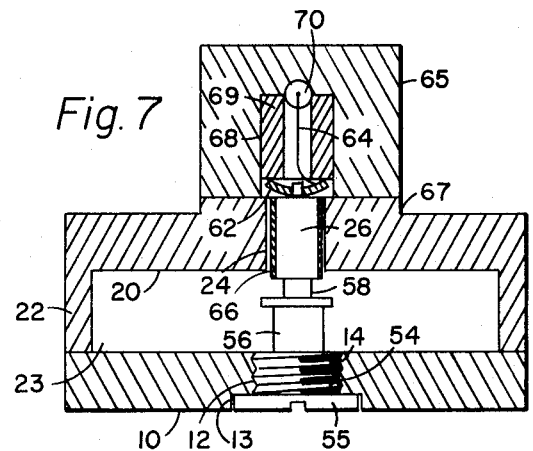

TEMPERATURE COMPENSATED TUNER AND OSCILLATOR

This application is a continuation of application Ser. No. 4,688 filed Jan. 21, 1970 and now abandoned.

BACKGROUND

A high frequency oscillator which does not vary in frequency with change in temperature has many uses. Many known high frequency oscillators include a tuned cavity or chamber as the tuned element thereof. Such oscillators vary in frequency with temperature changes primarily since the dimensions of the cavity varies with temperature changes. If the chamber is made of material which does not vary in dimensions with temperature, the resultant oscillator will have more nearly invariant frequency with temperature changes. However, such an oscillator is expensive to make due to material costs and due to the fact that the inside of the chamber should be plated with highly conductive material to raise the Q of the tuned circuit. If a tuner compensating means is used to reduce the variation of oscillator frequency with change in temperature, known temperature responsive tuner compensators have curves of frequency control which vary with temperatures differently than the variation in frequency of the oscillator with temperature, whereby the compensating means does not compensate uniformly at all operational temperatures.

It is an object of this invention to provide an improved means for compensating for the change in frequency of a resonant cavity due to change in temperature thereof.

It is a further object of this invention to provide an oscillator having improved constancy of frequency with change in temperature, the tuning element for the oscillator including a resonant chamber.

SUMMARY

In accordance with the invention, the change of tuning of a resonant cavity with temperature, the cavity comprising the tuning element of an oscillator, is reduced by providing means to move a dielectric rod into and out of the cavity in accordance with change in temperature thereof. The means to move the rod comprises a pre-stressed bowed metallic element whose ends are confined between parts of another metallic element. The temperature co-efficients of expansion of the two metallic elements are different.

DESCRIPTION

Figure 2:
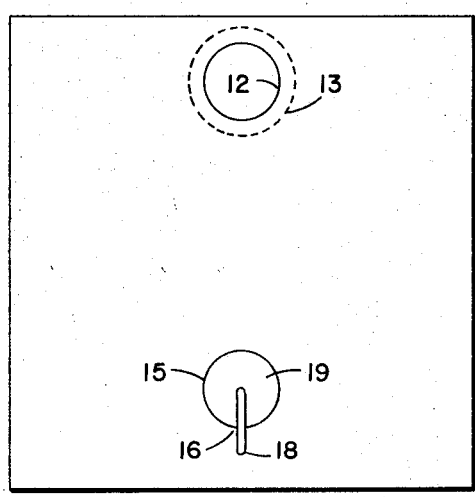
Figure 3:
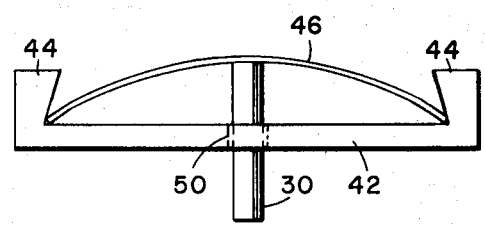
Figure 4:
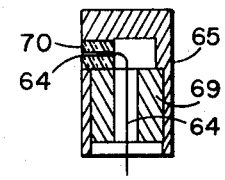

The invention will be better understood upon reading the following description in connection with the accompanying drawing in which FIG. 1 is a perspective view of an oscillator including the invention, FIG. 2 is a top view of a bottom plate comprising a portion of the oscillator of FIG. 1, FIG. 3 is an elevational view of the temperature compensator for the oscillator of FIG. 1, FIG. 4 is a section of a direct current connection for the oscillator of FIG. 1 taken perpendicularly to the temperature compensating part of FIG. 1, FIG. 5 is a bottom view of an upper plate comprising a portion of the oscillator of FIG. 1, FIG. 6 is a section of the oscillator of FIG. 1 through the temperature compensating portion thereof and looking in the direction of the direct current connector of that Figure, FIG. 7 is a section of the oscillator of FIG. 1 through the direct current connector, and FIG. 8 is an elevational view of a manual frequency controlled element for the oscillator of FIG. 1.

DRAWINGS

Turning first to FIG. 1, the oscillator disclosed is a Gunn oscillator comprising a tunable cavity having a diode therein, and means including direct current connections for the diode and both manual and temperature controlled tuning elements for varying the tuning of the cavity as well as output means for the oscillator. The oscillator will be described by describing the various elements thereof and by describing how they are assembled and how the assembled oscillator operates. In the description, where the means for fastening together the several elements is omitted, any known means for so fastening them may be used. The bottom plate of the resonant cavity, see FIGS. 1, 2, 6 and 7, will be described first.

The bottom plate 10 is rectangular in shape and has parallel edges and sides. A threaded hole 12 is provided through the pate 10 near one end thereof, see FIGS. 2 and 7, to receive a diode holder 14 as will be more fully described. Another hole 15 is provided through the plate 10, and a conductor 16 extends into the hole 14 through the center thereof and is bent over to form a loop and the end of the loop is soldered to the plate at 18 in a known manner, insulating material 19 filling the space between the wire 16 and the inside walls of the hole 15. As is known, the continuation of the wire 16 on the outside of the chamber, not shown, may be the center conductor of a coaxial high frequency output line (not shown) and the outer conductor of the coaxial line may be grounded to the bottom side of the plate 10. Also, as is known, the orientation of the loop provided by the conductor 16 may be chosen before soldering to provide maximum output power of the oscillator.

The top plate 20 of the oscillator is shown in FIGS. 1, 5, 6 and 7, the bottom thereof being shown in FIG. 5. The plate 20 has edge walls 22 around the four edges thereof whereby when the plates 10 and 20 are assembled as shown in FIGS. 1, 6 and 7, a resonant cavity 23 is formed. The plate 20 also has a hole 24 therethrough for slidably receiving a bushing 26, see FIGS. 5 and 7, and a hole 28 therethrough for slidably receiving a temperature compensating tuning rod 30, see FIG. 6. An internally threaded press fitted tube 32 fits a hole 34 in the plate 20 near the loop in the wire 16, when the plates 10 and 20 are assembled. A threaded plug 36 is threaded into the hole in the tube 32, the plug 36 holding a dielectric tuning rod 38 at the lower end thereof, as shown in FIGS. 1 and 8. The plug 36 has a kerf 40 to receive an adjusting tool. The upper portion of the internally threaded tube 32 may have a slit, part way down therethrough as shown in FIG. 1 by the perpendicularly extending slits 80, and a spring 82 may be provided to tension the tube 32 against the plug 36, whereby the plug will retain an adjustment thereof.

A temperature sensitive tuning compensating means is shown in FIGS. 1, 3 and 6. A narrow metallic bar 42 has upstanding portions 44 at each end thereof. The ends and two sides of each portion 44 terminates flush with the corresponding portions of the bar 42. The facing ends of the portions 44 are so slanted towards each other that the tops of the portions 44 are closer together than the bottoms of the portions 44. The bar and portions 44 may be integral in which case they are all of "Invar", a known alloy having a very small temperature co-efficient of expansion over a large useful temperature range. If desired, the portions 44 may be made separate and attached to the bar 42, which is made of "Invar". A metallic element 46 which is normally flat and thin is about as wide as the bar 42 and a little longer than the distance between the bottoms of the portions 44. This element 46 is bowed and forced into position between the portions 44 as shown in FIGS. 1 and 3, whereby the element 46 is pre-stressed. One end of the dielectric temperature compensated tuning element 30 is fixed to the under side of the metallic element 46 as by epoxy cement. The rod 30 extends through a hole 50 in the bar 42 and through the hole 28 in the plate 20 into the chamber 23 provided by the plates 10 and 20, as shown in FIG. 6, when the bar 42 is positioned in a notch 52 in the top of the plate 20, as shown in FIG. 1. As the temperature of the element 46 changes, the ends thereof pivot in the corners formed by the bar 42 and the end portions 44.

The diode holder 14 is shown in FIGS. 6 and 7. The diode holder 14 comprises a threaded portion 54 which may be threaded into the hole 12 and a flange portion 55 which abuts the bottom of a countersunk hole 13 in the plate 10 when the threaded portion has been threaded into the hole 12 to its full extent. One end of a diode 56 is connected electrically with threaded portion 54. When in place as shown in FIG. 7, the upper end 58 of the diode 56 contacts a solid slidable conductive bushing 26, the upper ends of which abuts a spring washer 62. The bushing 26 is wrapped with a very thin insulator such as very thin "Mylar" 66 and the washer 62 and the top of the bushing 26 are made small enough so that they will not contact the walls of the holes 24, whereby there is no electrical connection between the bushing 26 or the washer 62 and the plate 20. The top of the bushing 26 is reduced in size and fits in the hole in the washer 62 as shown in FIG. 7. A wire 64 which is soldered to the washer 62 runs up through a hole 68 in block 65. A hollow cylinder of insulating material 69 is placed in the hole 68 and the top of the washer 62 abuts the insulating cylinder 69. The wire 64 also runs through a known feed through capacitor 70 which insulates the wire 64 from the block 65 and yet acts to prevent high frequency current from going out along the wire 64. The length of the hole 24 is a quarter wavelength long to prevent leakage of the produced high frequency along the wire 64. As shown in FIGS. 1, 6 and 7, the direct current block 65 is a rectangular parallelopiped and it is positioned on a raised portion of the top of the plate 20.

When direct current is applied to the wire 64, a voltage is applied across the diode 56, the ground for the direct current being the housing comprising the plates 10 and 20. In a known manner, oscillations will be produced in the chamber 23 at a frequency determined by the dimensions of the chamber 23 and the positions of the rods 30 and 38. The oscillations may be of the Gunn type, the Impatt (impact transit time) type or the avalanche type. While the frequency may be tuned, in one construction thereof, over a range of about one half a gigahertz in the 5.4 to 5.9 gigahertz range by rotation of the plug 36 to move the dielectric rod 38 into and out of the chamber 23, the tuning of the oscillator will change with change in temperature. The change in frequency of the oscillator with temperature is greatly reduced by operation of the temperature compensating means described.

The bar 42 and the ends thereof may be of "Invar" and the element 46 may be of an aluminum alloy known as 2024T3. As the temperature changes, the distance between the ends of the elements 46 remain constant, however, the length of element 46 changes whereby the element becomes more bowed with increase in temperature or more nearly straight with decrease in temperature, carrying the dielectric rod 30 up and down with it. The compensation offered by the means of FIG. 3 is not uniform with change in temperature but is proportional to the absolute temperature T divided by the sign of the angle between the top of the bar 42 and the tangent to the top of the element 46 at the end thereof as shown in FIG. 6. It has been found that such temperature compensation minimizes the change in frequency of the described oscillator with changes in temperature.

The tuning rod 38 is within a tenth of a wavelength from the output loop formed by the wire 16 to reduce variations in output power as the cavity 23 is tuned by rotation of the plug 36.

What is claimed is:

1. In combination, a negative resistance high frequency oscillator including a cavity, a negative resistance diode coupled with said cavity and means for compensating for changes in tuning of said cavity due to changes in temperature affecting said cavity and said diode comprising:

a metallic enclosure including such oscillator cavity therein, a metallic resilient element of uniform material having spaced ends and having an unstressed state in which said element is substantially straight, said resilient element being stressed into bow shape;

the length of said resilient element being relatively variable with variations of temperature;

abutment means for holding said resilient element in said bow shape;

said abutment means comprising a base member on said enclosure and abutment members on said base member at the ends thereof for retaining said spaced ends of said resilient metallic element at substantially a constant distance apart and in said bowed condition;

the length of said base member being essentially invariable with changes in temperature, a tuning member, one end of which is fixed to a side of said resilient metallic element substantially midway of said spaced ends and the other end of which extends into said cavity substantially at right angles to said resilient metallic element, said cavity and said tuning compensating means being positioned to be exposed to the same ambient temperature; and said other end of said tuning member being adapted to move inwardly and outwardly of said cavity with changes in temperature in proportion to the ratio of the absolute temperature and the sine of the angle between one end of said base member and said resilient element.

2. The invention of claim 1 in which said metallic resilient element and said abutment means are of materials having different temperature coefficients of expansion.

3. The invention of claim 1 in which said metallic resilient element is of aluminum and said abutment means is of Invar.

4. The invention of claim 1 in which an additional controllable tuning element is provided in said cavity.

5. The invention of claim 2 in which said abutment means comprises a bar of Invar having upstanding end portions which face each other.

* * * * *